US012766626B2

(12) United States Patent
Han et al.

(10) Patent No.: US 12,766,626 B2
(45) Date of Patent: Oct. 20, 2026

(54) WELDING DEVICE FOR SUPPRESSING WELDING HOT CRACKS, AND WELDING SYSTEM

(71) Applicant: CRRC QINGDAO SIFANG CO., LTD., Qingdao (CN)

(72) Inventors: Xiaohui Han, Qingdao (CN); Shuaizhen Li, Qingdao (CN); Zhiyi Zhang, Qingdao (CN); Peng Wang, Qingdao (CN); Zhendong Mao, Qingdao (CN); Guolong Ma, Qingdao (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 584 days.

(21) Appl. No.: 18/547,147

(22) PCT Filed: Jan. 5, 2022

(86) PCT No.: PCT/CN2022/070338
§ 371 (c)(1),
(2) Date: Aug. 18, 2023

(87) PCT Pub. No.: WO2022/257446
PCT Pub. Date: Dec. 15, 2022

(65) Prior Publication Data

US 2024/0316681 A1 Sep. 26, 2024

(30) Foreign Application Priority Data

Jun. 10, 2021 (CN) ......................... 202110648169.8

(51) Int. Cl.
*B23K 9/02* (2006.01)
*B23K 9/32* (2006.01)
(Continued)

(52) U.S. Cl.
CPC ............ *B23K 9/325* (2013.01); *B23K 9/0213* (2013.01); *B23K 9/122* (2013.01); *B23K 9/295* (2013.01)

(58) Field of Classification Search
CPC ...... B23K 9/325; B23K 9/0213; B23K 9/122; B23K 9/295
See application file for complete search history.

(56) References Cited

U.S. PATENT DOCUMENTS 4,098,029 A * 7/1978 Shiets ..................... B24B 5/363 451/439
4,386,259 A 5/1983 Nagai et al.
(Continued)

FOREIGN PATENT DOCUMENTS

CN 1657211 A 8/2005
CN 101412143 A 4/2009
(Continued)

OTHER PUBLICATIONS

International Search Report dated Mar. 30, 2022 issued in International Application No. PCT/CN2022/070338 (with English translation).
(Continued)

*Primary Examiner* — Lorne E Meade
(74) *Attorney, Agent, or Firm* — Womble Bond Dickinson (US) LLP

(57) ABSTRACT

A welding apparatus comprising a first fixing plate and a second fixing plate arranged at an interval; a gas-electric slip ring is connected to the side of the first fixing plate facing the second fixing plate; a hollow shaft drive unit is connected to the side of the second fixing plate facing the first fixing plate; a conductive link is connected to the hollow shaft drive unit and passes through the second fixing plate; a curved conductive nozzle is connected to the conductive link on the outer side of the second fixing plate; and a plurality of
(Continued)

support rods are uniformly distributed around the rotational axial direction of the hollow shaft drive unit, and are respectively connected to the first fixing plate and the second fixing plate; the hollow shaft drive unit drives the conductive link to rotate, and the conductive link drives the curved conductive nozzle to oscillate.

14 Claims, 6 Drawing Sheets

(51) Int. Cl.
*B23K 9/12* (2006.01)
*B23K 9/29* (2006.01)

(56) References Cited

U.S. PATENT DOCUMENTS

| | | | | |
|---|---|---|---|---|
| 5,990,473 | A * | 11/1999 | Dickey | G01D 5/34723 250/221 |
| 2005/0028897 | A1 | 2/2005 | Kurz et al. | |

FOREIGN PATENT DOCUMENTS

| | | | |
|---|---|---|---|
| CN | 102430846 | A | 5/2012 |
| CN | 102896400 | A | 1/2013 |
| CN | 103600161 | A | 2/2014 |
| CN | 105798471 | A | 7/2016 |
| CN | 110434428 | A | 11/2019 |
| CN | 210099183 | U | 2/2020 |
| CN | 111390358 | A | 7/2020 |
| CN | 111906416 | A | 11/2020 |
| CN | 112828455 | A | 5/2021 |
| CN | 213135761 | U | 5/2021 |
| CN | 113399801 | A | 9/2021 |
| WO | 2016090903 | A1 | 6/2016 |

OTHER PUBLICATIONS

Search Report issued in priority application (CN 2021106481698).

Extended Search Report received in related European application No. 22819055.9, mailed Sep. 3, 2024, 11 pages.

* cited by examiner

WELDING DEVICE FOR SUPPRESSING WELDING HOT CRACKS, AND WELDING SYSTEM

CROSS-REFERENCE TO RELATED APPLICATION

The present application claims priority to International Application No. PCT/CN2022/070338, filed Jan. 5, 2022, entitle "WELDING APPARATUS FOR SUPPRESSING WELDING THERMAL CRACKS, AND WELDING SYSTEM" which itself claims priority to Chinese application No. 202110648169.8 filed on Jun. 10, 2021, entitled "WELDING DEVICE FOR INHIBITING WELDING HOT CRACKS AND WELDING SYSTEM", both of which are incorporated herein by reference in their entirety.

FIELD

The present application relates to the field of welding, in particular to a welding device for suppressing welding hot cracks and a welding system.

BACKGROUND

Aluminum alloy materials, due to advantages of high specific strength, good plasticity and corrosion resistance, have been widely used as a lightweight bearing structure in rail transit, high-speed rail and aerospace, and play an important role in the field of lightweight vehicles. A welding hot crack is a welding defect that is easy to occur in a welding process for aluminum alloy. A fluidity of liquid metal in a weld pool, a microstructure state of a weld joint, and a low melting point eutectic dispersion state has a significant effect on the generation of welding hot cracks. During a welding cooling process, the weld joint and its heat affected zone metal located at a tail end of the weld pool are in a solid-liquid coexistence stage, and the solidified dendritic skeleton is surrounded by liquid metal. When the liquid metal has good fluidity, a dendritic gap can be filled by the flow of liquid metal to promote the healing of cracks. When a dendritic crystal is developed and the liquid metal has weak fluidity, liquid metal would be retained between the dendritic crystals, and a liquid film with poor plasticity is formed. Further, if it is subjected to tensile strain, cracks are easy to occur. The coarser and greater the microstructure of the weld joint, the more obvious the directionality of a columnar crystal, and the more obvious the tendency of generating hot cracks in weld joints. Impurity elements are segregated at crystal boundary to form low-melting point eutectic, which is prone to generate welding hot cracks. Therefore, how to improve the fluidity of liquid metal, refine the microstructure of the weld joint, make the low-melting point eutectic be in dispersive distribution, reduce the segregation of impurity elements, and then suppress the generation of welding hot cracks has become an urgent problem to be solved.

SUMMARY

The present application provides a welding device for suppressing welding hot cracks, which solves defects that when a dendritic crystal is developed and liquid metal has weak fluidity, liquid metal would be retained between dendritic crystals, and a liquid film with poor plasticity is formed; if the liquid film is subjected to tensile strain, cracks are easy to occur; the coarser and greater the microstructure of the weld joint, the more obvious the directionality of a columnar crystal; and impurity elements are segregated at grain boundaries to form low-melting point eutectic, and the welding hot cracks are prone to occur. By an electric arc oscillation, the flow of liquid metal is facilitated, the microstructure of the weld joint is refined, the segregation of impurity elements is reduced, the liquid metal flows back from a weld pool area to a liquefaction area at crystal boundaries of the heat affected area, the crack generation is reduced, and the resistance of crack propagation is increased to suppress generation of the aluminum alloy welding hot cracks.

The present application further provides a welding system for suppressing welding hot cracks, which solves the defect that when a dendritic crystal is developed and liquid metal has weak fluidity, liquid metal would be retained between dendritic crystals, and a liquid film with poor plasticity is formed; if the liquid film is subjected to tensile strain, cracks are easy to occur; the coarser and greater the microstructure of the weld joint, the more obvious the directionality of a columnar crystal; and impurity elements are segregated at grain boundaries to form low-melting point eutectic, and welding hot cracks are prone to occur. By an electric arc oscillation, the liquid weld pool of aluminum alloy welding is stirred to improve the fluidity of liquid metal, refine the microstructure of the weld joint, reduce the element segregation, disperse the low-melting point eutectic and make it discontinuously distributed, reduce the crack generation, disturb the crystallization direction of columnar crystals, destroy the continuity of liquid films, increase the resistance of crack propagation, and promote the flowback of liquid metal to the dendrite gap and promote the healing of cracks.

According to embodiments of the present application, a welding device for suppressing welding hot cracks includes a first fixing plate, a second fixing plate, a gas-electric slip ring, a hollow shaft drive unit, a conductive link, a curved contact tip and a plurality of support rods;

- where the first fixing plate and the second fixing plate are arranged at intervals;
- the gas-electric slip ring is connected with a side of the first fixing plate facing to the second fixing plate;
- the hollow shaft drive unit is connected with a side of the second fixing plate facing to the first fixing plate;
- the conductive link is connected with the hollow shaft drive unit and passes through the second fixing plate;
- the curved contact tip is connected with the conductive link outside the second fixing plate;
- the support rods are uniformly distributed in a rotating axial direction of the hollow shaft drive unit, and are connected with the first fixing plate and the second fixing plate, respectively; and
- the hollow shaft drive unit drives the conductive link to rotate, and the conductive link drives the curved contact tip to oscillate.

It should be noted that in the present application, by driving the curved contact tip to oscillate back and forth to control the oscillation of the electric arc through the hollow shaft drive unit, such as a hollow shaft motor, the liquid aluminum alloy in the weld pool is stirred to improve the fluidity of weld pool, which plays a role of scouring dendritic tips, thus breaking and remelting the dendritic tips, increasing the nucleation particles, refining microstructure of the weld joint, and reducing the tendency of generating hot cracks, reducing the segregation of impurity elements and the low-melting point eutectic disperses and intermittent distributes to reduce the generation of cracks, disturbing the crystallization direction of columnar crystals, destroying the continuity of liquid films, and increasing the resistance of crack propagation. Therefore, the liquid metal flows back from the weld pool area to the liquefaction area at crystal boundaries of the heat affected area, which promotes the liquid metal to fill the dendrite gap and heal the cracks in the weld joint and its heat affected area in time.

It should be further noted that, in the present application, a welding current path, a shielding gas path and a welding wire feeding path in the process of an electric arc oscillation are provided through a gas-electric slip ring, which solves the problem of frequently oscillating a welding cable, the shielding gas path and a welding wire feeding pipe in the process of the electric arc oscillation, and makes the welding process more stable and reliable. The speed of the electric arc oscillation is controlled by the speed of the hollow shaft motor, and the amplitude and side wall residence time of the electric arc oscillation are controlled by a photoelectric sensor, the speed, oscillating amplitude and side wall residence time of the electric arc oscillation can be quantitatively controlled.

According to an embodiment of the present application, the gas-electric slip ring includes a gas-electric slip ring stator, a gas-electric slip ring mover, a gas-electric slip ring first cable and a gas-electric slip ring second cable;

where the gas-electric slip ring stator is connected with the first fixing plate;

the gas-electric slip ring first cable is connected with the gas-electric slip ring stator;

the gas-electric slip ring second cable is connected with the gas-electric slip ring mover; and the gas-electric slip ring second cable is connected with the conductive link to supply power for the curved contact tip.

Specifically, the present embodiment provides an implementation of the gas-electric slip ring. By arranging the gas-electric slip ring stator and the gas-electric slip ring mover, the welding current path is smooth during the oscillation process of the hollow shaft drive unit driving the curved contact tip, which ensures that the power is supplied to the curved contact tip.

Further, by the arrangement of the gas-electric slip ring first cable and the gas-electric slip ring second cable, the welding current path is formed. The gas-electric slip ring first cable is connected with an output port of a welding power gun, a first end of the gas-electric slip ring second cable is connected with the gas-electric slip ring first cable, and a second end of the gas-electric slip ring second cable is connected with the conductive link, and the power is supplied to the curved contact tip through the conductive link.

It should be noted that the hollow shaft drive unit may be a hollow shaft motor.

According to an embodiment of the present application, the gas-electric slip ring further includes a gas-electric slip ring first gas port and a gas-electric slip ring second gas port;

where the gas-electric slip ring first gas port is connected with a side of the gas-electric slip ring stator distal to the gas-electric slip ring mover;

the gas-electric slip ring second gas port is connected with a side of the gas-electric slip ring mover distal to the gas-electric slip ring stator;

the gas-electric slip ring second gas port is connected with the conductive link through a pipeline; and the gas-electric slip ring first gas port, the gas-electric slip ring second gas port, the pipeline and the conductive link are communicated in turn to form a shielding gas path.

Specifically, the present embodiment provides another implementation of the gas-electric slip ring. By arranging the gas-electric slip ring first gas port and the gas-electric slip ring second gas port, the shielding gas path is smooth during the oscillation process of the hollow shaft drive unit driving the curved contact tip, which ensures transportation of the shielding gas during the welding process.

Further, an output interface of a shielding gas cylinder is communicated with the gas-electric slip ring first gas port. The shielding gas is transported to the weld pool by the output interface of the shielding gas cylinder, the gas-electric slip ring first gas port, the gas-electric slip ring second gas port, the pipeline and the conductive link.

It should be noted that the conductive link is a hollow metal rod.

In an embodiment, the pipeline is a hose. A first end of the pipeline is connected to the gas-electric slip ring second gas port, and a second end of the pipeline is connected to the conductive link. The pipeline is arranged as the hose to facilitate the pipeline to rotate with the rotation of the gas-electric slip ring mover and the conductive link.

According to an embodiment of the present application, the welding device for suppressing welding hot cracks further includes a flow divider, where the flow divider is sleeved on a side of the conductive link close to the curved contact tip and is communicated with the shielding gas path.

Specifically, the present embodiment provides an implementation of the flow divider. The flow divider is arranged on the side of the conductive link close to the curved contact tip, and the flow divider is communicated with the shielding gas path through the conductive link, which divides the shielding gas through the flow divider.

It should be noted that some gas holes are arranged on the flow divider, and through holes communicated with the flow divider are arranged on the conductive link, and the shielding gas path is communicated with the external space through the through holes on the conductive link and the gas holes on the flow divider.

It should be further noted that the present application does not describe the specific structure of the flow divider. In practical applications, the specific structure of the flow divider can refer to the relevant design in this field. The flow divider and the conductive link can be connected by means of thread, clamping and magnetic attraction.

In an embodiment, the outer side of the flow divider is further covered with a flow guide groove, and the flow guide groove guides the shielding gas flowing from the flow divider to the side of the curved conductive nozzle more intensively.

According to an embodiment of the present application, the welding device for suppressing welding hot cracks further includes a conductive ring, the conductive ring is arranged on a side of the hollow shaft drive unit close to the gas-electric slip ring mover and is sleeved on an outer side of the conductive link;

the gas-electric slip ring second cable is connected with the conductive ring; and the conductive ring supplies power to the hollow shaft drive unit and the curved contact tip through the conductive link.

Specifically, the present embodiment provides an implementation of the conductive ring. By arranging the conductive ring, the electric energy transmitted by the gas-electric slip ring is transmitted to the hollow shaft drive unit and the curved contact tip through the conductive ring and the conductive rod.

It should be noted that the power transmission between the conductive ring and the conductive rod can be transmitted through metal contact.

In an embodiment, the conductive ring and the conductive rod rotate together.

In another embodiment, the conductive ring only supplies power only to the curved contact tip through the conductive link, and the hollow shaft drive unit obtains power from the outside.

In another embodiment, the conductive ring supplies power to the hollow shaft drive unit and the curved contact tip through the conductive link.

According to an embodiment of the present application, the welding device for suppressing welding hot cracks further includes a wire feeding pipe, where the wire feeding pipe passes through the gas-electric slip ring stator, the gas-electric slip ring mover and the conductive link in turn, and feeds a welding wire to the curved contact tip.

Specifically, the embodiment provides an implementation of the wire feeding pipe. Providing the wire feeding pipe is equivalent to providing a channel for welding wire to pass through. The wire feeding pipe passes through the gas-electric slip ring stator, the gas-electric slip ring mover and the conductive link in turn, which ensures that the welding wire can be transported from the outside to the curved contact tip.

In an embodiment, the center of each of the gas-electric slip ring stator and the gas-electric slip ring mover is provided with a through hole for the wire feeding pipe to pass through, and the conductive link is also correspondingly arranged at the center of the gas-electric slip ring stator and the gas-electric slip ring mover. As such, the wire feeding pipe passes through the center of the entire device and directly delivers the welding wire to the curved contact tip.

According to an embodiment of the present application, the welding device for suppressing welding hot cracks further includes a limit baffle and a plurality of first sensors;

where the limit baffle is connected with a side of the conductive link close to the curved contact tip; and the first sensors are arranged on a side of the second fixing plate distal to the first fixing plate and are used for measuring an oscillating angle of the curved contact tip.

Specifically, the present embodiment provides an implementation of the limit baffle and the first sensor. The limit baffle can oscillate with the oscillation of the curved contact tip. The number of the first sensors may be at least three and the first sensors are used for measuring an oscillating origin, an oscillating left limit and an oscillating right limit of the curved contact tip.

In an embodiment, the limiting baffle is connected to the conductive link or the flow divider, and can oscillate synchronously with the curved contact tip to trigger the first sensors and transmit an oscillating position signal of the curved contact tip. When the curved contact tip passes through a weld joint center, a weld joint groove left wall and a weld joint groove right wall, the limit baffle triggers the first sensors for oscillating origin, the first sensors for oscillating a left limit and the first sensors for oscillating right limit, respectively.

According to an embodiment of the present application, each support rod includes a first adjusting section, a second adjusting section and an adjusting joint;

where the first adjusting section is connected with the first fixing plate;

the second adjusting section is connected with the second fixing plate;

the first adjusting section and the second adjusting section are connected by the adjusting joint;

at least one of the first adjusting section or the second adjusting section is a telescopic rod with adjustable telescopic length, and an angle between the first adjusting section and the second adjusting section is adjustable by the adjusting joint.

Specifically, the present embodiment provides an implementation of the support rod. By arranging the first adjusting section, the second adjusting section and the adjusting joint, the length and angle of the support rod are adjusted, and the corresponding angle of the curved contact tip is adjusted when the welding parts with different angles are welded. At least one of the first adjusting section or the second adjusting section has adjustable length, and the length of the support rod can be adjusted according to the distance between the curved contact tip and the welding part. By the adjusting joint, the angle between the first adjusting section and the second adjusting section is transformed, and the “uphill” and “downhill” of the curved contact tip during the welding process is implemented, avoiding the fluctuation caused by the change of the angle of the welding part along the welding direction or the flatness of the welding part itself, which leads to the oscillating effect and the welding quality of the curved contact tip.

In an embodiment, the number of the support rods is four, and each of the support rods includes the first adjusting section, the second adjusting section and the adjusting joint; the length of the support rod is adjusted by the first adjusting section and the second adjusting section, and the adjusting joint ensures the adjustment of the angle between the first adjusting section and the second adjusting section to realize the “uphill” and “downhill” of the curved contact tip during the welding process.

According to an embodiment of the present application, the welding device for suppressing welding hot cracks further includes a plurality of second sensors, and the second sensors are arranged on a side of the second fixing plate distal to the first fixing plate;

where the second sensors are arranged in one-to-one correspondence with the support rods and are used for measuring a horizontal height of the curved contact tip.

Specifically, the present embodiment provides an implementation of the second sensors. By arranging the second sensors, the surface flatness of the welding part or the angle of the welding part can be changed, and then the posture of the welding device for suppressing welding hot cracks can be planned according to the change and the elongation length and angle of each support rod are adjusted to meet the “uphill” and “downhill” of the curved contact tip.

According to a second aspect of the embodiments of the present application, a welding system for suppressing welding hot cracks including any one of the welding devices for suppressing welding hot cracks mentioned above is provided.

The above one or more solutions in the embodiments of the present application have one or more of the following effects. The present application provides a welding device for suppressing welding hot cracks and a welding system. By an electric arc oscillation, the flow of liquid metal is facilitated, the microstructure of the weld joint is refined, the segregation of impurity elements is reduced, the liquid metal flows back from the weld pool area to the liquefaction area at crystal boundaries of the heat affected area, the crack generation is reduced, and the resistance of crack propagation is increased to suppress generation of the aluminum alloy welding hot cracks.

Additional aspects and advantages of the present application are set forth, and in part, from the following description, the part would become clear from the following description, or be learned by practice of the present application.

BRIEF DESCRIPTION OF THE DRAWINGS

In order to more clearly illustrate the solutions disclosed in the embodiments of the present application or the related art, the drawings used in the descriptions of the embodiments or the related art are briefly described below. The drawings in the following description are only of certain embodiments of the present application, and other drawings may be obtained according to these drawings without any creative efforts for those skilled in the art.

Figure 1:
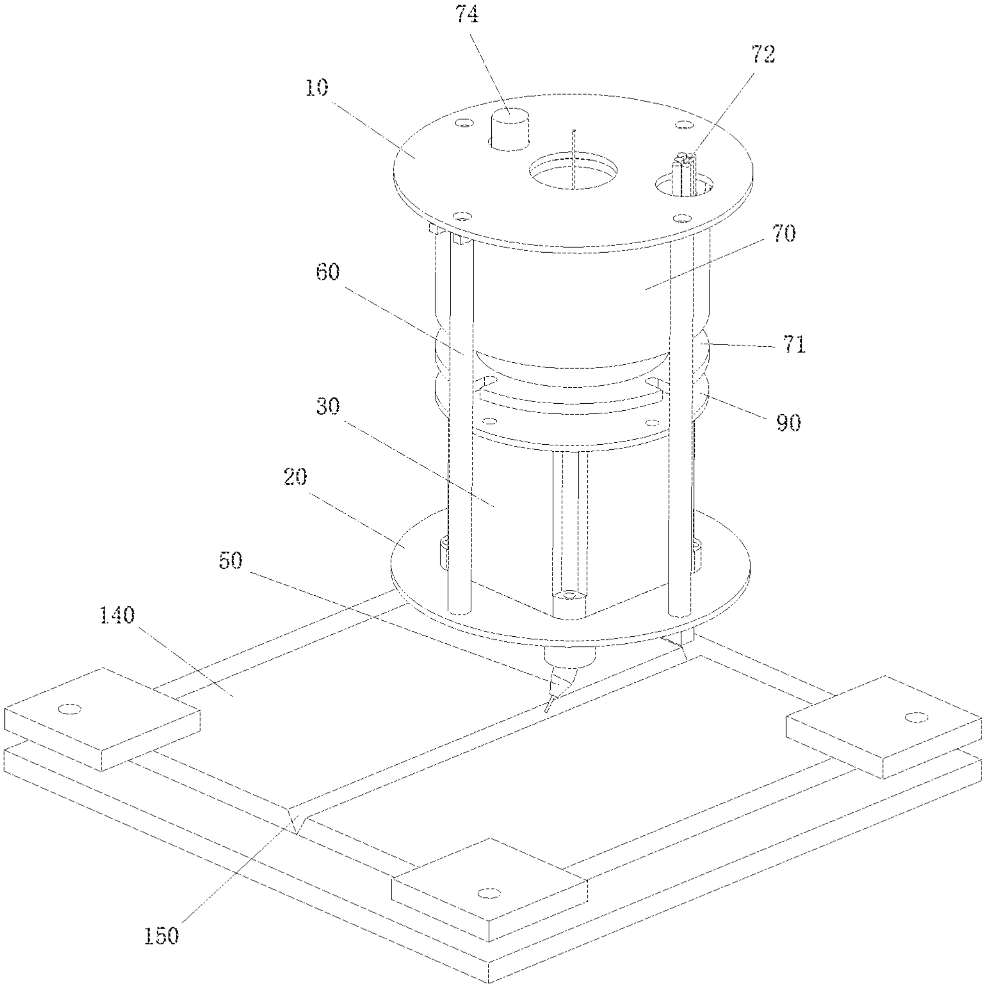
FIG. 1 is a first schematic diagram showing an assembly relationship of a welding device for suppressing welding hot cracks according to an embodiment of the present application.

| Reference numerals: | |
|---|---|
| 10: | first fixing plate; |
| 20: | second fixing plate; |
| 30: | hollow shaft drive unit; |
| 40: | conductive link; |
| 50: | curved contact tip; |
| 60: | support rod; |
| 61: | first adjusting section; |
| 62: | second adjusting section; |
| 63: | adjusting joint; |
| 70: | gas-electric slip ring stator; |
| 71: | gas-electric slip ring mover; |
| 72: | gas-electric slip ring first cable; |
| 73: | gas-electric slip ring second cable; |
| 74: | gas-electric slip ring first gas port; |
| 75: | gas-electric slip ring second gas port; |
| 80: | flow divider; |
| 81: | flow guide groove; |
| 90: | conductive ring; |
| 100: | wire feeding pipe; |
| 110: | limit baffle; |
| 120: | first sensor; |
| 130: | second sensor; |
| 140: | welding part; |
| 150: | weld pool. |

DETAILED DESCRIPTION

In order to make the objectives, solutions and advantages of the embodiments of the present application clearer, the solutions in the embodiments of the present application are clearly and completely described in the following with reference to the accompanying drawings in the embodiments of the present application. These embodiments are a part of the embodiments of the present application, and not all of the embodiments. All other embodiments obtained by a person of ordinary skill in the art based on the embodiments of the present application without any creative effort fall in the scope of the present application.

In the description of the present application, it should be noted that, the orientation or positional relations specified by terms such as “central”, “longitudinal”, “transverse”, “upper”, “lower”, “front”, “rear”, “left”, “right”, “vertical”, “horizontal”, “top”, “bottom”, “inner”, “outer” and the like, are based on the orientation or positional relations shown in the drawings, which are merely for convenience of description of the present application and to simplify description, but do not indicate or imply that the stated devices or members must have the particular orientation and be constructed and operated in a particular orientation, and thus these can not to be construed as limiting the present application. Furthermore, the terms “first”, “second”, “third” and the like are only used for descriptive purposes and should not be construed as indicating or implying a relative importance.

Figure 2:
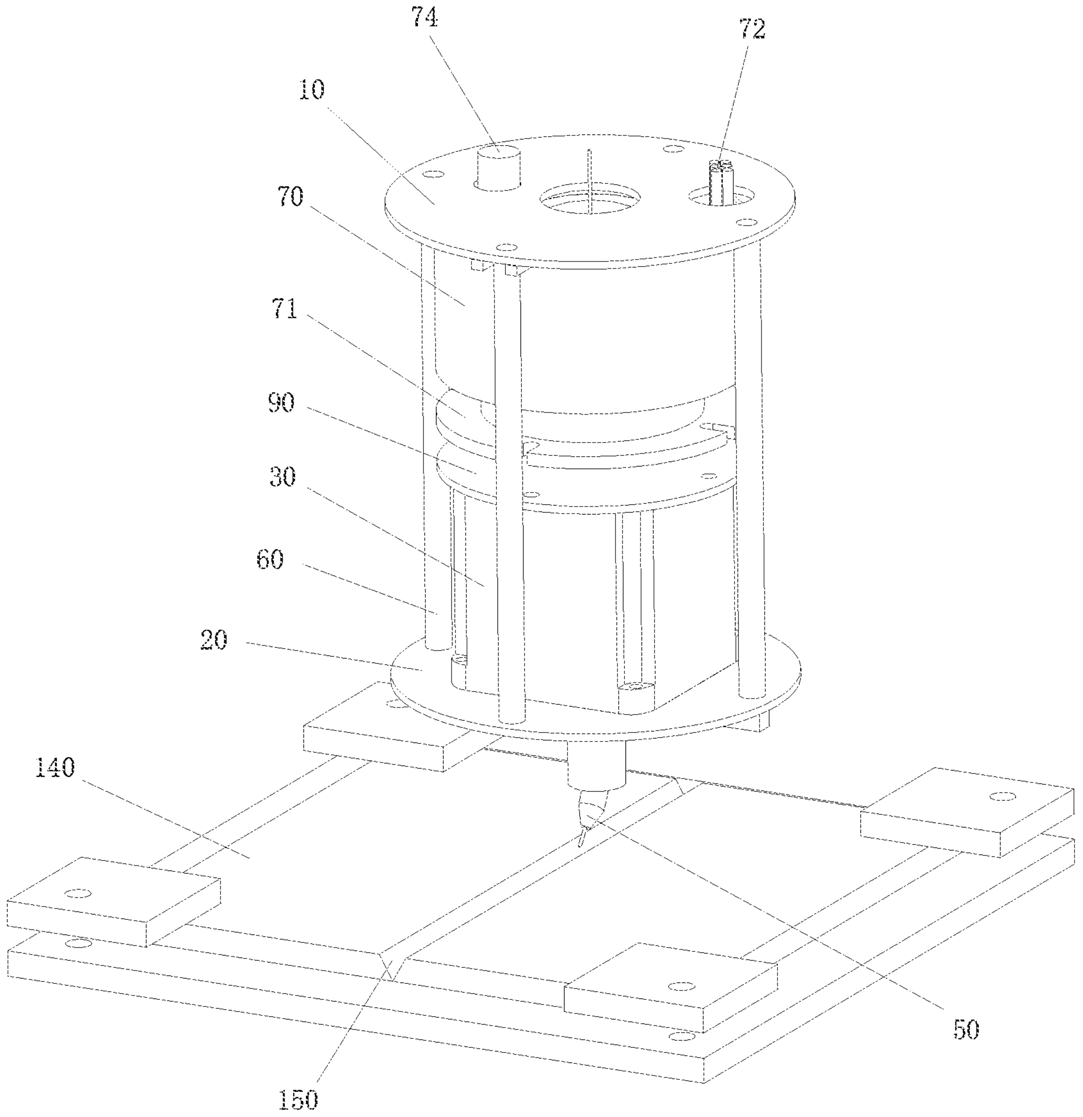
FIG. 2 is a second schematic diagram showing an assembly relationship of a welding device for suppressing welding hot cracks according to an embodiment of the present application.
Figure 3:
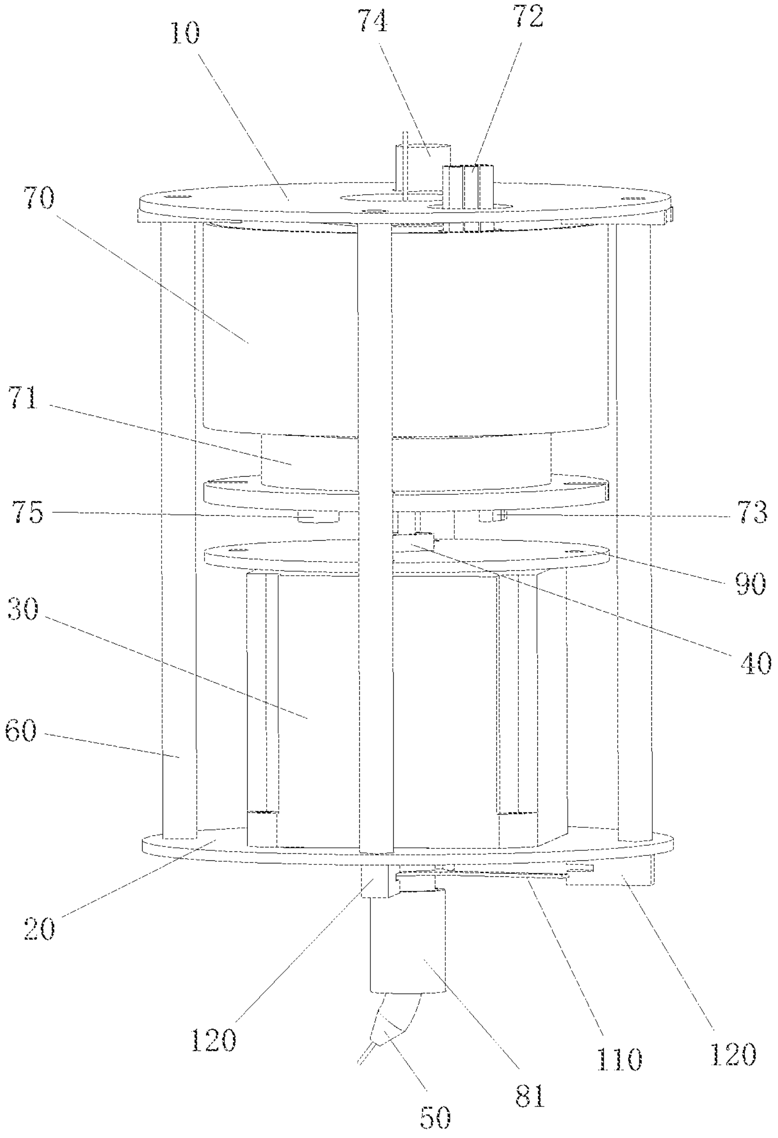
FIG. 3 is a third schematic diagram showing an assembly relationship of a welding device for suppressing welding hot cracks according to an embodiment of the present application.
Figure 4:
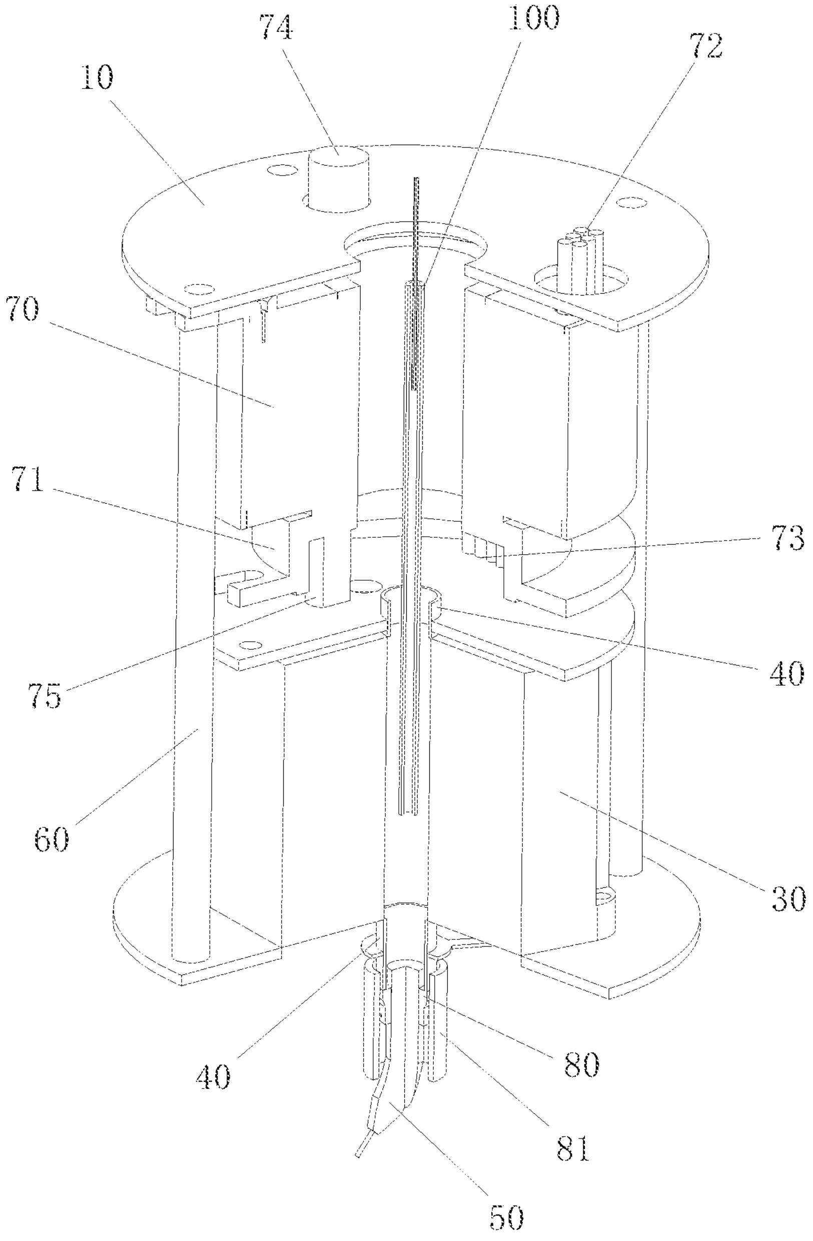
FIG. 4 is a fourth schematic diagram showing an assembly relationship of a welding device for suppressing welding hot cracks according to an embodiment of the present application.
Figure 5:
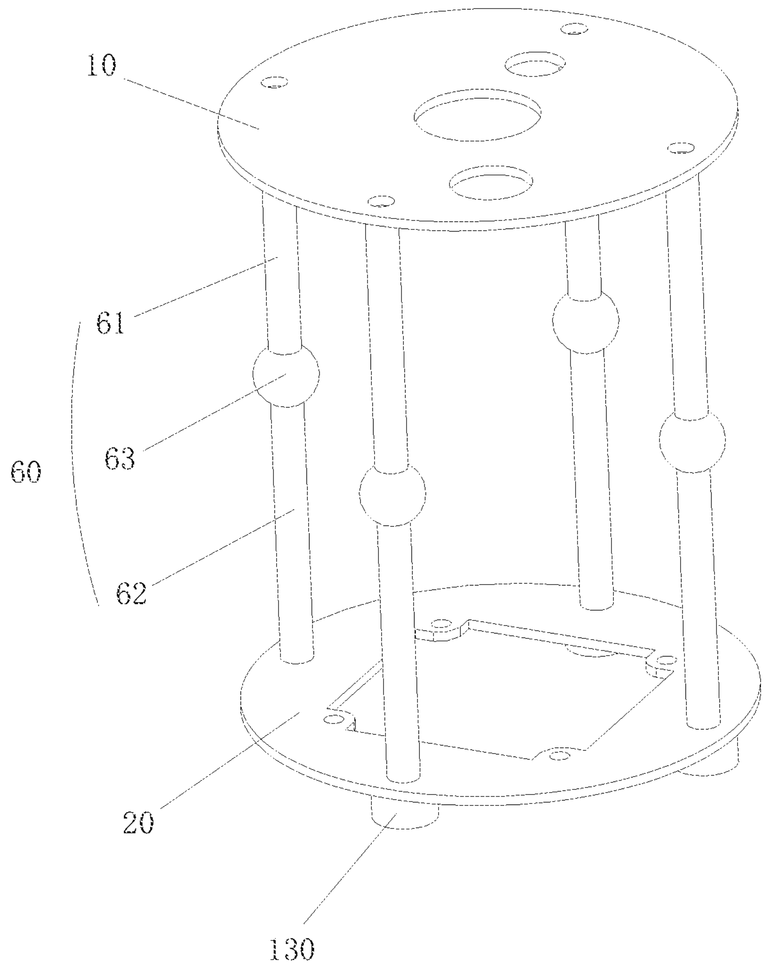
FIG. 5 is a first schematic diagram showing a structural relationship of support rods in a welding device for suppressing welding hot cracks according to an embodiment of the present application.
Figure 6:
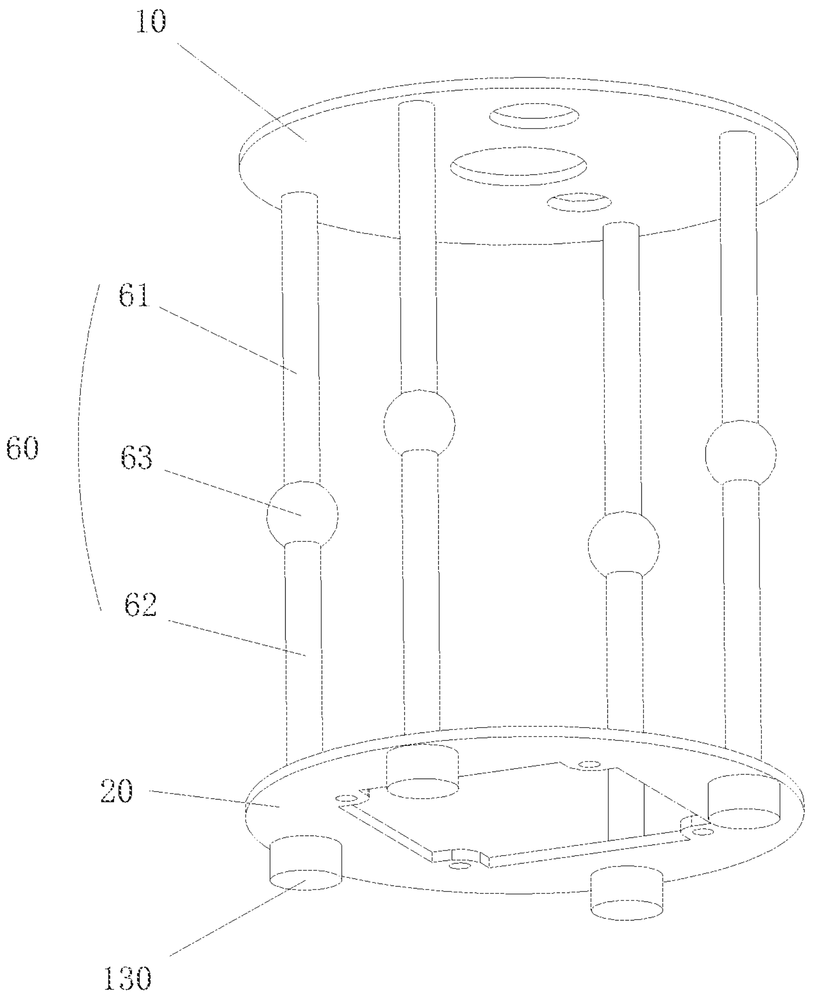
FIG. 6 is a second schematic diagram showing a structural relationship of support rods in a welding device for suppressing welding hot cracks according to an embodiment of the present application.

In some embodiments of the present application, as shown in FIG. 1 to FIG. 6, an embodiment of the present application provides a welding device for suppressing welding hot cracks, including a first fixing plate 10, a second fixing plate 20, a gas-electric slip ring, a hollow shaft drive unit 30, a conductive link 40, a curved contact tip 50 and a plurality of support rods 60. The first fixing plate 10 and the second fixing plate 20 are arranged at intervals. The gas-electric slip ring is connected with a side of the first fixing plate 10 facing to the second fixing plate 20. The hollow shaft drive unit 30 is connected with a side of the second fixing plate 20 facing to the first fixing plate 10. The conductive link 40 is connected with the hollow shaft drive unit 30 and passes through the second fixing plate 20; the curved contact tip 50 is connected with the conductive link 40 outside the second fixing plate 20. The support rods 60 are uniformly distributed in a rotating axial direction of the hollow shaft drive unit 30, and are connected with the first fixing plate 10 and the second fixing plate 20. The hollow shaft drive unit 30 drives the conductive link 40 to rotate, and the conductive link 40 drives the curved contact tip 50 to oscillate.

In detail, the present application provides a welding device for suppressing welding hot cracks which solves defects that when a dendritic crystal is developed and liquid metal has weak fluidity, liquid metal would be retained between dendritic crystals, a liquid film with poor plasticity is formed; if the liquid film is subjected to tensile strain, cracks are easy to occur; the coarser and greater the microstructure of the weld joint, the more obvious the directionality of a columnar crystal; and impurity elements are segregated at grain boundaries to form low-melting point eutectic, and the welding hot cracks are prone to occur. By an electric arc oscillation, the flow of liquid metal is facilitated, the microstructure of the weld joint is refined, the segregation of impurity elements is reduced, the liquid metal flows back from the weld pool 150 area to the liquefaction area at crystal boundaries of the heat affected area, the crack generation is reduced, and the resistance of crack propagation is increased to suppress generation of the aluminum alloy welding hot cracks.

It should be noted that in the present application, by driving the curved contact tip 50 to oscillate back and forth to control the oscillation of the electric arc through the hollow shaft drive unit, for example, a hollow shaft motor, the liquid weld pool 150 of aluminum alloy welding is stirred to improve the fluidity of weld pool 150, which plays a role of scouring dendritic tips, thus breaking and remelting the dendritic tips increasing the nucleation particles, refining microstructure of the weld joint, and reducing the tendency of generating hot cracks, reducing the segregation of impurity elements and the low-melting point eutectic disperses and intermittent distributes to reduce the generation of cracks, disturbing the crystallization direction of columnar crystals, destroying the continuity of liquid films, and increasing the resistance of crack propagation. Therefore, the liquid metal flows back from the weld pool 150 area to the liquefaction area at crystal boundaries of the heat affected area, which promotes the liquid metal to fill the dendrite gap and heal the cracks in the weld joint and its heat affected area in time.

It should be further noted that, in the present application, a welding current path, a shielding gas path and a welding wire feeding path in the process of an electric arc oscillation are provided through a gas-electric slip ring, which solves the problem of frequently oscillating a welding cable, the shielding gas path and a welding wire feeding pipe 100 in the process of the electric arc oscillation, and makes the welding process more stable and reliable. The speed of the electric arc oscillation is controlled by the speed of the hollow shaft motor, and the amplitude and side wall residence time of the electric arc oscillation are controlled by a photoelectric sensor, and the speed, oscillating amplitude and side wall residence time of the electric arc oscillation can be quantitatively controlled.

According to an embodiment of the present application, the gas-electric slip ring includes a gas-electric slip ring stator 70, a gas-electric slip ring mover 71, a gas-electric slip ring first cable 72 and a gas-electric slip ring second cable 73. The gas-electric slip ring stator 70 is connected with the first fixing plate 10; the gas-electric slip ring first cable 72 is connected with the gas-electric slip ring stator 70; the gas-electric slip ring second cable 73 is connected with the gas-electric slip ring mover 71; and the gas-electric slip ring second cable 73 is connected with the conductive link 40 to supply power for the curved contact tip 50.

Specifically, the present embodiment provides an implementation of the gas-electric slip ring. By arranging the gas-electric slip ring stator 70 and the gas-electric slip ring mover 71, the welding current path is smooth during the oscillation process of the hollow shaft drive unit 30 driving the curved contact tip 50, which ensures the power supply to the curved contact tip 50.

Further, by the arrangement of the gas-electric slip ring first cable 72 and the gas-electric slip ring second cable 73, the welding current path is formed. The gas-electric slip ring first cable 72 is connected with an output port of a welding power gun, a first end of the gas-electric slip ring second cable 73 is connected with the gas-electric slip ring first cable 72, and a second end of the gas-electric slip ring second cable 73 is connected with the conductive link 40, and the power is supplied to the curved contact tip 50 through the conductive link 40.

It should be noted that the hollow shaft drive unit 30 may be a hollow shaft motor.

According to an embodiment of the present application, the gas-electric slip ring further includes a gas-electric slip ring first gas port 74 and a gas-electric slip ring second gas port 75. The gas-electric slip ring first gas port 74 is connected with a side of the gas-electric slip ring stator 70 distal to the gas-electric slip ring mover 71. The gas-electric slip ring second gas port 75 is connected with a side of the gas-electric slip ring mover 71 distal to the gas-electric slip ring stator 70. The gas-electric slip ring second gas port 74 is connected with the conductive link 40 through a pipeline. The gas-electric slip ring first gas port 74, the gas-electric slip ring second gas port 75, the pipeline and the conductive link 40 are communicated in turn to form a shielding gas path.

Specifically, the present embodiment provides another implementation of the gas-electric slip ring. By arranging the gas-electric slip ring first gas port 74 and the gas-electric slip ring second gas port 75, the shielding gas path is smooth during the oscillation process of the hollow shaft drive unit 30 driving the curved contact tip 50, which ensures transportation of the shielding gas during the welding process.

Further, an output interface of a shielding gas cylinder is communicated with the gas-electric slip ring first gas port 74. The shielding gas is transported to the weld pool 150 by the output interface of the shielding gas cylinder, the gas-electric slip ring first gas port 74, the gas-electric slip ring second gas port 75, the pipeline and the conductive link 40.

It should be noted that the conductive link 40 is a hollow metal rod.

In an embodiment, the pipeline is a hose. A first end of the pipeline is connected to the gas-electric slip ring second gas port 75, and a second end of the pipeline is connected to the conductive link 40. The pipeline is arranged as the hose to facilitate the pipeline to rotate with the rotation of the gas-electric slip ring mover 71 and the conductive link 40.

According to an embodiment of the present application, the welding device for suppressing welding hot cracks further includes a flow divider 80. The flow divider 80 is sleeved on a side of the conductive link 40 close to the curved contact tip 50 and is communicated with the shielding gas path.

Specifically, the present embodiment provides an implementation of the flow divider 80. The flow divider 80 is arranged on the side of the conductive link 40 close to the curved contact tip 50, and the flow divider 80 is communicated with the shielding gas path through the conductive link 40, which divides the shielding gas through the flow divider 80.

It should be noted that some gas holes are arranged on the flow divider 80, and through holes communicated with the flow divider 80 are arranged on the conductive link 40, and the shielding gas path is communicated with the external space through the through holes on the conductive link 40 and the gas holes on the flow divider 80.

It should be further noted that the present application does not describe the specific structure of the flow divider 80. In practical applications, the specific structure of the flow divider 80 can refer to the relevant design in this field. The flow divider 80 and the conductive link 40 can be connected by means of thread, clamping and magnetic attraction.

In an embodiment, the outer side of the flow divider 80 is further covered with a flow guide groove 81, and the flow guide groove 81 guides the shielding gas flowing from the flow divider 80 to the side of the curved conductive nozzle 50 more intensively.

According to an embodiment of the present application, the welding device for suppressing welding hot cracks further includes a conductive ring 90, the conductive ring 90 is arranged on a side of the hollow shaft drive unit 30 close to the gas-electric slip ring mover 71 and is sleeved on an outer side of the conductive link 40; the gas-electric slip ring second cable 73 is connected with the conductive ring 90; and the conductive ring 90 supplies power to the hollow shaft drive unit 30 and the curved contact tip 50 through the conductive link 40.

Specifically, the present embodiment provides an implementation of the conductive ring 90. By arranging the conductive ring 90, the electric energy transmitted by the gas-electric slip ring is transmitted to the hollow shaft drive unit 30 and the curved contact tip 50 through the conductive ring 90 and the conductive link 40.

It should be noted that the power transmission between the conductive ring 90 and the conductive link 40 can be transmitted through metal contact.

In an embodiment, the conductive ring 90 and the conductive link 40 rotate together.

In another embodiment, the conductive ring 90 only supplies power to the curved contact tip 50 through the conductive link 40, and the hollow shaft drive unit 30 obtains power from the outside.

In another embodiment, the conductive ring 90 supplies power to the hollow shaft drive unit 30 and the curved contact tip 50 through the conductive link 40.

According to an embodiment of the present application, the welding device for suppressing welding hot cracks further includes a wire feeding pipe 100, the wire feeding pipe 100 passes through the gas-electric slip ring stator 70, the gas-electric slip ring mover 71 and the conductive link 40 in turn, and feeds a welding wire to the curved contact tip 50.

Specifically, the present embodiment provides an implementation of the wire feeding pipe 100. The arrangement of the wire feeding pipe 100 is equivalent to arranging a channel for welding wire to pass through. The wire feeding pipe 100 passes through the gas-electric slip ring stator 70, the gas-electric slip ring mover 71 and the conductive link 40 in turn, which ensures that the welding wire is transported from the outside to the curved contact tip 50.

In an embodiment, the center of each of the gas-electric slip ring stator 70 and the gas-electric slip ring mover 71 is provided with a through hole for the wire feeding pipe 100 to pass through, and the conductive link 40 is also correspondingly arranged at the center of the gas-electric slip ring stator 70 and the gas-electric slip ring mover 71. As such, the wire feeding pipe 100 passes through the center of the entire device and directly delivers the welding wire to the curved contact tip 50.

According to an embodiment of the present application, the welding device for suppressing welding hot cracks further includes a limit baffle 110 and a plurality of first sensors 120. The limit baffle 110 is connected with a side of the conductive link 40 close to the curved contact tip 50. A plurality of the first sensors 120 are arranged on a side of the second fixing plate 20 distal to the first fixing plate 10 and are used for measuring an oscillating angle of the curved contact tip.

Specifically, the present embodiment provides an implementation of the limit baffle 110 and the first sensors 120. The limit baffle 110 can oscillate with the oscillation of the curved contact tip 50. The number of the first sensors 120 may be at least three, and the first sensors 120 are used for measuring an oscillating origin, an oscillating left limit and an oscillating right limit of the curved contact tip 50.

In an embodiment, the limiting baffle 110 is connected to the conductive link 40 or the flow divider 80, and can oscillate synchronously with the curved contact tip 50 to trigger the first sensors 120 and transmit an oscillating position signal of the curved contact tip 50. When the curved contact tip 50 passes through a weld joint center a weld joint groove left wall and a weld joint groove right wall, the limit baffle 110 triggers the first sensors 120 for the oscillating origin, the first sensors 120 of the oscillating left limit and the first sensors 120 for the oscillating right limit respectively.

According to an embodiment of the present application, the support rod 60 includes a first adjusting section 61, a second adjusting section 62 and an adjusting joint 63. The first adjusting section 61 is connected with the first fixing plate 10; the second adjusting section 62 is connected with the second fixing plate 20; the first adjusting section 61 and the second adjusting section 62 are connected by the adjusting joint 63; and at least one of the first adjusting section 61 or the second adjusting section 62 is a telescopic rod with adjustable telescopic length, and an angle between the first adjusting section 61 and the second adjusting section 62 can be adjusted by the adjusting joint 63.

Specifically, the present embodiment provides an implementation of the support rod 60. By arranging the first adjusting section 61, the second adjusting section 62 and the adjusting joint 63, the length and angle of the support rod 60 are adjusted, and the corresponding angle of the curved contact tip 50 is adjusted when the welding parts 140 with different angles are welded. At least one of the first adjusting section 61 or the second adjusting section 62 is adjustable, and the length of the support rod 60 can be adjusted according to the distance between the curved contact tip 50 and the welding part 140. By the adjusting joint 63, the angle between the first adjusting section 61 and the second adjusting section 62 is transformed, and the “uphill” and “downhill” of the curved contact tip 50 during the welding process is implemented, avoiding the fluctuation caused by the change of the angle of the welding part 140 along the welding direction or the flatness of the welding part 140 itself, which leads to the oscillating effect and the welding quality of the curved contact tip 50.

In an embodiment, the number of the support rods 60 is four, and each of the support rods 60 includes the first adjusting section 61, the second adjusting section 62 and the adjusting joint 63; the length of the support rod is adjusted by the first adjusting section 61 and the second adjusting section 62, and the adjusting joint 63 ensures the adjustment of the angle between the first adjusting section 61 and the second adjusting section 62 to realize the “uphill” and “downhill” of the curved contact tip 50 during the welding process.

According to an embodiment of the present application, the welding device for suppressing welding hot cracks further includes a plurality of second sensors 130, and the second sensors 130 are arranged on a side of the second fixing plate 20 distal to the first fixing plate 10; where the second sensors 130 are arranged in one-to-one correspondence with the support rod 60 are used for measuring a horizontal height of the curved contact tip 50.

Specifically, the present embodiment provides an implementation of the second sensors 130. By arranging the second sensors 130, the surface flatness of the welding part 140 or the angle of the welding part 140 can be changed, and then the posture of the welding device for suppressing welding hot cracks can be planned according to the change and the elongation length and angle of each support rod 60 are adjusted to meet the "uphill" and "downhill" of the curved contact tip 50.

In some embodiments of the present application, a welding system for suppressing welding hot cracks including any one of the welding devices for suppressing welding hot cracks mentioned above is provided.

In detail, the present application further provides a welding system for suppressing welding hot cracks which solves the defects that when a dendritic crystal is developed and liquid metal has weak fluidity, liquid metal would be retained between dendritic crystals, and a liquid film with poor plasticity is formed; if the liquid film subjected to tensile strain, cracks are easy to occur; the coarser and greater the microstructure of the weld joint, the more obvious the directionality of a columnar crystal; and impurity elements are segregated at grain boundaries to form low-melting point eutectic, and welding hot cracks are prone to occur. By an electric arc oscillation, the liquid weld pool 150 of aluminum alloy welding is stirred to improve the fluidity of liquid metal, refine the microstructure of the weld joint, reduce the element segregation, disperse the low-melting point eutectic and make it discontinuously distributed, reduce the crack generation, disturb the crystallization direction of columnar crystals, destroy the continuity of liquid films, increase the resistance of crack propagation, and promote the flowback of liquid metal to the dendrite gap and promote the healing of cracks.

In the description of the present application, it should be noted that unless explicitly specified and defined otherwise, the terms "connected to" and "connected" shall be understood broadly, for example, it may be either fixedly connected or detachably connected, or can be integrated; it may be either mechanically connected, or electrically connected; and it may be either directly connected, or indirectly connected through an intermediate medium. The specific meanings of the terms above in the present application can be understood by those skilled in the art in accordance with specific conditions.

In the description of this specification, description with reference to the terms "one embodiment", "some embodiments", "an example", "specific example", "some examples" and the like, refers to that specific features, structures, materials or characteristics described in combination with an embodiment or an example are included in at least one embodiment or example according to the embodiments of the present application. In the present specification, schematic representations of the above terms are not necessarily directed to a same embodiment or example. Furthermore, the particular features, structures, materials or characteristics described can be combined in any suitable manner in any one or more embodiments or examples. In addition, those skilled in the art may combine the different embodiments or examples, as well as the features of the different embodiments or examples described in this specification, without conflicting each other.

Finally, it should be noted that the above embodiments are only used for illustrating the present application, rather than limiting the present application. Although the present application is described in detail with reference to the above embodiments, those of ordinary skill in the art should understand that the various combinations, modifications or equivalent replacements of the solutions of the present application are not departed from the scope of the solutions of the present application, and should be covered in the scope of the claims of the present application.

What is claimed is:

1. A welding device for suppressing welding hot cracks, comprising:

a first fixing plate, a second fixing plate, a gas-electric slip ring, a hollow shaft drive unit, a conductive link, a curved contact tip and a plurality of support rods, wherein the first fixing plate and the second fixing plate are arranged at intervals;

the gas-electric slip ring is connected with a side of the first fixing plate facing to the second fixing plate;

the hollow shaft drive unit is connected with a side of the second fixing plate facing to the first fixing plate;

the conductive link is connected with the hollow shaft drive unit and passes through the second fixing plate;

the curved contact tip is connected with the conductive link outside the second fixing plate;

the support rods are uniformly distributed around a rotating axial direction of the hollow shaft drive unit, and are connected with the first fixing plate and the second fixing plate, respectively; and the hollow shaft drive unit drives the conductive link to rotate, and the conductive link drives the curved contact tip to oscillate;

wherein the gas-electric slip ring comprises a gas-electric slip ring stator, a gas-electric slip ring mover, a gas-electric slip ring first cable and a gas-electric slip ring second cable, wherein the gas-electric slip ring stator is connected with the first fixing plate;

the gas-electric slip ring first cable is connected with the gas-electric slip ring stator;

the gas-electric slip ring second cable is connected with the gas-electric slip ring mover; and the gas-electric slip ring second cable is connected with the conductive link to supply power for the curved contact tip.

2. The welding device of claim 1, wherein the gas-electric slip ring further comprises a gas-electric slip ring first gas port and a gas-electric slip ring second gas port;

the gas-electric slip ring first gas port is connected with a side of the gas-electric slip ring stator distal to the gas-electric slip ring mover;

the gas-electric slip ring second gas port is connected with a side of the gas-electric slip ring mover distal to the gas-electric slip ring stator;

the gas-electric slip ring second gas port is connected with the conductive link through a pipeline; and the gas-electric slip ring first gas port, the gas-electric slip ring second gas port, the pipeline and the conductive link are communicated in turn to form a shielding gas path.

3. The welding device of claim 2, further comprising: a flow divider, wherein the flow divider is sleeved on a side of the conductive link close to the curved contact tip and is communicated with the shielding gas path.

4. The welding device of claim 3, wherein each of the support rods comprises a first adjusting section, a second adjusting section and an adjusting joint;

the first adjusting section is connected with the first fixing plate;

the second adjusting section is connected with the second fixing plate;

the first adjusting section and the second adjusting section are connected by the adjusting joint; and at least one of the first adjusting section or the second adjusting section is a telescopic rod with adjustable telescopic length, and an angle between the first adjusting section and the second adjusting section is adjustable by the adjusting joint.

5. The welding device of claim 2, wherein each of the support rods comprises a first adjusting section, a second adjusting section and an adjusting joint;

the first adjusting section is connected with the first fixing plate;

the second adjusting section is connected with the second fixing plate;

the first adjusting section and the second adjusting section are connected by the adjusting joint; and at least one of the first adjusting section or the second adjusting section is a telescopic rod with adjustable telescopic length, and an angle between the first adjusting section and the second adjusting section is adjustable by the adjusting joint.

6. The welding device of claim 1, further comprising: a conductive ring, wherein the conductive ring is arranged on a side of the hollow shaft drive unit close to the gas-electric slip ring mover and is sleeved on an outer side of the conductive link;

the gas-electric slip ring second cable is connected with the conductive ring; and the conductive ring supplies power to the hollow shaft drive unit and the curved contact tip through the conductive link.

7. The welding device of claim 6, wherein each of the support rods comprises a first adjusting section, a second adjusting section and an adjusting joint;

the first adjusting section is connected with the first fixing plate;

the second adjusting section is connected with the second fixing plate;

the first adjusting section and the second adjusting section are connected by the adjusting joint; and at least one of the first adjusting section or the second adjusting section is a telescopic rod with adjustable telescopic length, and an angle between the first adjusting section and the second adjusting section is adjustable by the adjusting joint.

8. The welding device of claim 1, further comprising: a wire feeding pipe, wherein the wire feeding pipe passes through the gas-electric slip ring stator, the gas-electric slip ring mover and the conductive link in turn to feed a welding wire to the curved contact tip.

9. The welding device of claim 8, wherein each of the support rods comprises a first adjusting section, a second adjusting section and an adjusting joint;

the first adjusting section is connected with the first fixing plate;

the second adjusting section is connected with the second fixing plate;

the first adjusting section and the second adjusting section are connected by the adjusting joint; and at least one of the first adjusting section or the second adjusting section is a telescopic rod with adjustable telescopic length, and an angle between the first adjusting section and the second adjusting section is adjustable by the adjusting joint.

10. The welding device of claim 1, further comprising: a limit baffle and a plurality of first sensors, wherein the limit baffle is connected with a side of the conductive link close to the curved contact tip; and the first sensors are arranged on a side of the second fixing plate distal to the first fixing plate and are used for measuring an oscillating angle of the curved contact tip.

11. The welding device of claim 10, wherein each of the support rods comprises a first adjusting section, a second adjusting section and an adjusting joint;

the first adjusting section is connected with the first fixing plate;

the second adjusting section is connected with the second fixing plate;

the first adjusting section and the second adjusting section are connected by the adjusting joint; and at least one of the first adjusting section or the second adjusting section is a telescopic rod with adjustable telescopic length, and an angle between the first adjusting section and the second adjusting section is adjustable by the adjusting joint.

12. The welding device of claim 1, wherein each of the support rods comprises a first adjusting section, a second adjusting section and an adjusting joint;

the first adjusting section is connected with the first fixing plate;

the second adjusting section is connected with the second fixing plate;

the first adjusting section and the second adjusting section are connected by the adjusting joint; and at least one of the first adjusting section or the second adjusting section is a telescopic rod with adjustable telescopic length, and an angle between the first adjusting section and the second adjusting section is adjustable by the adjusting joint.

13. The welding device of claim 12, further comprising: a plurality of second sensor, wherein the second sensors are arranged on a side of the second fixing plate distal to the first fixing plate;

the second sensors are arranged in one-to-one correspondence with the support rods and are used for measuring a horizontal height of the curved contact tip.

14. A welding system for suppressing welding hot cracks, comprising the welding device of claim 1.

* * * * *